United States Patent [19]

Gauthier

[11] Patent Number: 4,521,517

[45] Date of Patent: Jun. 4, 1985

[54] COMPOST AERATION SYSTEM

[75] Inventor: L. Paul Gauthier, Falls Church, Va.

[73] Assignee: Gauthier, Alvarado & Associates, Inc., Falls Church, Va. ; a part interest

[21] Appl. No.: 488,435

[22] Filed: Apr. 25, 1983

[51] Int. Cl.[3] .................. C12M 1/00; C12M 1/04; C05F 11/08

[52] U.S. Cl. .................. 435/313; 435/287; 435/818; 422/184; 71/9

[58] Field of Search ............. 435/287, 313, 818; 422/184, 231; 71/9

[56] References Cited

U.S. PATENT DOCUMENTS

| | | | |
|---|---|---|---|
| 1,959,554 | 5/1934 | Stich | 435/313 X |
| 3,138,448 | 6/1964 | Schulze | 71/9 |
| 3,401,085 | 9/1968 | Croon et al. | 435/313 X |
| 3,802,957 | 4/1974 | Cusi | 435/800 X |
| 3,895,916 | 7/1975 | Rosner | 71/9 |
| 4,060,390 | 11/1977 | Shimizu et al. | 71/9 |
| 4,230,676 | 10/1980 | Taylor et al. | 435/313 X |
| 4,233,266 | 11/1980 | Kummer | 422/184 |
| 4,236,910 | 12/1980 | Norin | 435/313 X |
| 4,288,241 | 9/1981 | Shelef | 71/9 |

FOREIGN PATENT DOCUMENTS 1597354 9/1981 United Kingdom .............. 71/9

OTHER PUBLICATIONS

Willson et al, Manual for Composting Sewage Sludge by the Beltsville Aerated-Pile Method, Cincinnati, Ohio, U.S. Environmental Protection Agency, Publication EPA-600/8-80-022, May 1980, pp. 22-32.

*Primary Examiner*—Sidney Marantz
*Assistant Examiner*—Randall E. Deck
*Attorney, Agent, or Firm*—Kimmel, Crowell & Weaver

[57] ABSTRACT

A permanent underground compost aeration system enables forward and reverse circulation of air through a compost pile by a single non-reversible blower and air pipe dampering arrangement. Adequate oxygenization of an entire compost pile is assured. Outside air in varying amounts can be introduced into the aeration system during its operation to provide fine control of oxygenation. A complete underground moisture drainage arrangement for the aeration system is provided to prevent flooding of the system. The aeration system is compatible with computer controls for air volume, temperature and moisture content. A pair of parallel elongated main header pipes are connected with two groups of smaller apertured air distribution pipes extending in opposite directions at right angles to the header pipes. All pipes of the aeration system have bottom moisture drain openings. A single non-reversible blower with damper controls allows air to be delivered to the aeration system through one or both main header pipes with or without the addition of ambient air to the system in varying amounts. Multiple air flow circulation paths through a compost pile are enabled by the system.

2 Claims, 9 Drawing Figures

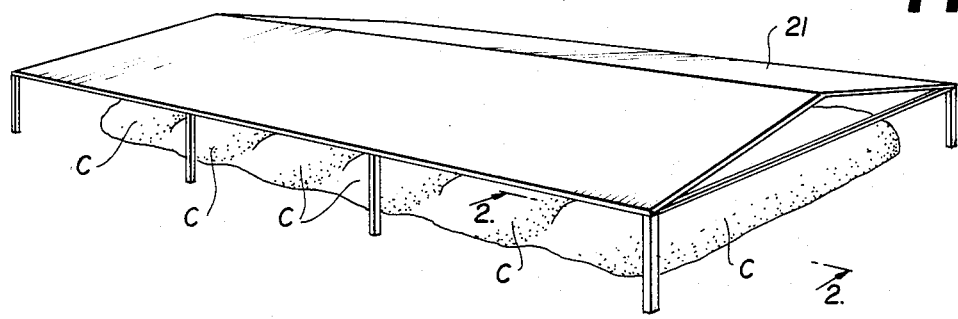
FIG.1
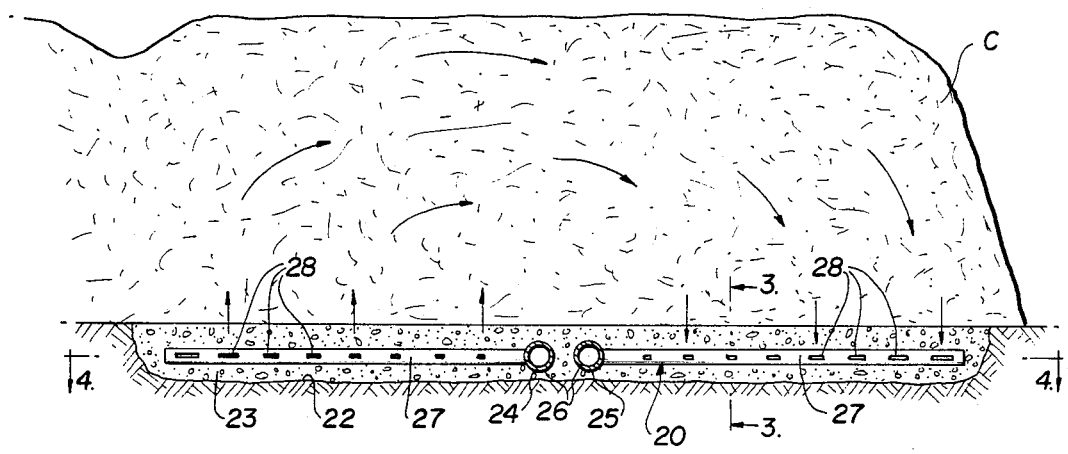
FIG.2
FIG.3
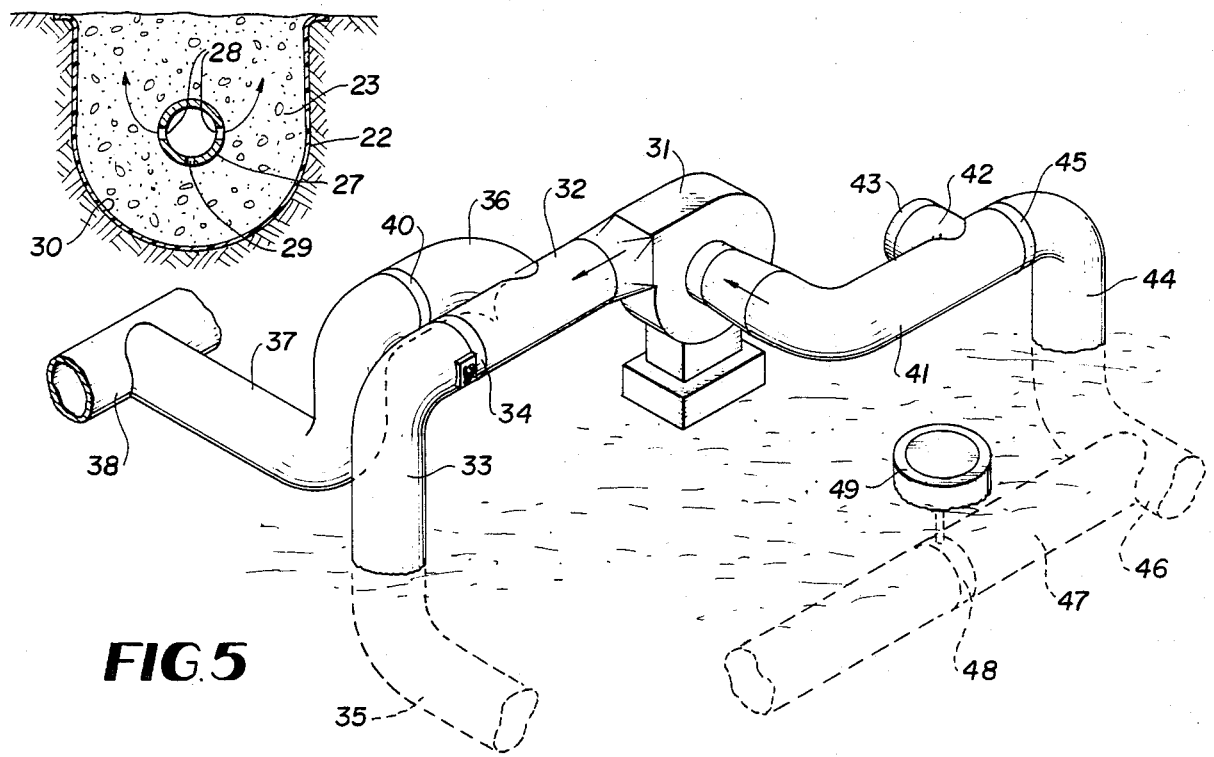
FIG.5

COMPOST AERATION SYSTEM

BACKGROUND OF THE INVENTION

The objective of the present invention is to provide an improved system for the aeration of large compost piles produced by modern composting plants. To a great extent, the satisfactory cost effective operation of the entire composting plant depends on the proper aeration of the compost resulting from plant operation. Proper aeration of compost piles includes adequate oxygenation, temperature and moisture control. Ideally, the aeration system must be capable of finely controlling these variables without unduly complicated and costly machinery. The present invention satisfies all of the above requirements for a more efficient and more cost effective compost aeration system in a permanent underground installation which is readily expandable to meet the needs of a composting plant of almost any conceivable size.

Other features and advantages of the invention will become apparent during the course of the following description.

BRIEF DESCRIPTION OF THE DRAWINGS

FIG. 1 is a perspective view of a permanent underground compost aeration system according to the present invention.

FIG. 2 is an enlarged vertical section taken through one unit of the aeration system on line 2—2 of FIG. 1.

FIG. 3 is an enlarged fragmentary vertical section taken on line 3—3 of FIG. 2.

FIG. 5 is a perspective view of a system blower and associated above-ground components.

DETAILED DESCRIPTION

Figure 4:
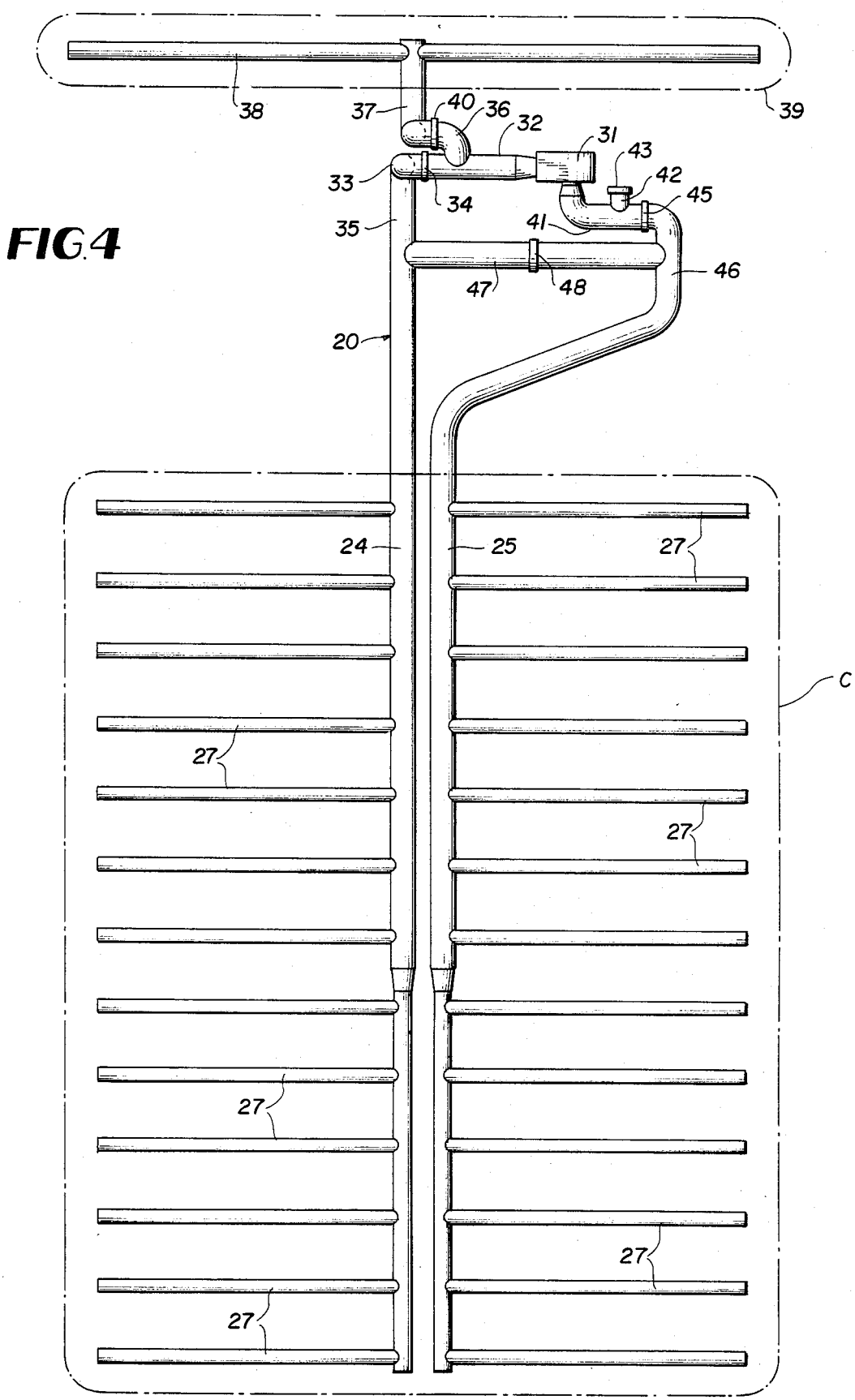
FIG. 4 is a horizontal section taken on line 4—4 of FIG. 2.

Referring to the drawings in detail wherein like numerals designate like parts, the numeral 20, FIGS. 2 and 4, designates one self-contained independently operable unit of the aeration system for the aeration of one large compost pile C. With reference to FIG. 1, several side-by-side compost piles arranged beneath a protective roof 21 may undergo aeration simultaneously or separately in varying degrees utilizing the damper controls present in each aeration unit 20, to be described. Since each unit 20 is a complete operational unit and identical to all other units of the system, a full description of the unit 20 serves to describe an aeration system made up of any number of units 20.

Referring to FIG. 2, a shallow ground excavation 22 contains the aeration unit 20 as a permanent subterranean fixed installation. Preferably, the excavation 22 includes separate shallow trenches for each branch pipe of the complete aeration system unit 20. When installed, the underground aeration pipes are completely embedded in a gravel fill 23, as best shown in FIGS. 2 and 3 to promote proper drainage of the system.

Each unit 20 of the system comprises a pair of closely spaced parallel long main header pipes 24 and 25 having bottom moisture drain openings 26 provided therein at regularly spaced intervals along their buried lengths. Extending outwardly laterally from each header pipe 24 and 25 and communicating therewith is a multiplicity of smaller diameter spaced parallel branch aeration pipes 27 of equal lengths and being at right angles to the header pipes 24 and 25. The precise number of branch pipes 27 included in the aeration system unit 20 may be varied and the arrangement shown in FIG. 4 represents a typical preferred embodiment.

Each branch pipe 27 is provided in its opposite sides at regularly spaced intervals along its length with pairs of air slots 28 and is similarly provided in its bottom with spaced moisture drainage openings 29, FIG. 3. Preferably, in the interest of uniform air distribution throughout the compost pile, the air slots 28 of the branch pipes 27 are graduated in size along the branch pipes with the smallest air slots disposed nearest the header pipes 24 and 25 and the largest slots nearest the outer ends of the branch pipes.

To promote proper drainage of the system and to avoid flooding, each gravel-filled trench 22 is provided with a moisture-impermeable drainage liner 30, such as a tough plastics or fiberglass liner. The pipes making up the system unit 20 may likewise be formed of fiberglass or the like although other materials, including metal, could be employed in the aeration system. The trenches which receive the main header pipes 24 and 25 are also equipped with the drainage liners 30.

Near one end of the unit 20 and spaced from the underground pipe portion thereof is an above-ground non-reversible blower 31 for circulating air through the system in several different modes shown in FIGS. 6-9. Air taken into the blower 31 is delivered through an above-ground outlet pipe 32 to a descending elbow 33 equipped with an adjustable damper 34. The elbow 33 is connected with an upstream buried terminal portion 35 of the main header pipe 24.

Another elbow 36 connected into the blower outlet pipe 32 upstream of the damper 34 leads to a muffler supply pipe 37 which in turn is connected centrally with a ground level single muffler pipe 38, preferably parallel to the aeration branch pipes 27. The muffler pipe 38 is also provided in its opposite sides with the aforementioned air slots 28. The muffler pipe 38 and its supply pipe 37 are preferably at ground level and the muffler pipe is preferably covered by a relatively small compost pile 39 to enhance noise and odor suppression. Another damper 40 is provided within the elbow 36 to control the delivery of air to the muffler 38.

The system further comprises an above-ground air supply pipe 41 for the blower 31 having a fresh air intake branch 42 equipped with an adjustable damper 43. A descending elbow 44 leading to the pipe 41 contains another damper 45 near one side of the fresh air inlet branch 42. The elbow 44 is connected with a buried terminal 46 of the main header pipe 25.

The system further comprises a transfer pipe 47 connected between the buried terminals 35 and 46 of main header pipes 24 and 25 and this pipe 47, which is also buried, contains a damper 48 having a ground level access port 49, FIG. 5.

OPERATION

The aeration system unit 20 above-described is capable of the following operational modes shown in FIGS. 6-9.

Figure 6:
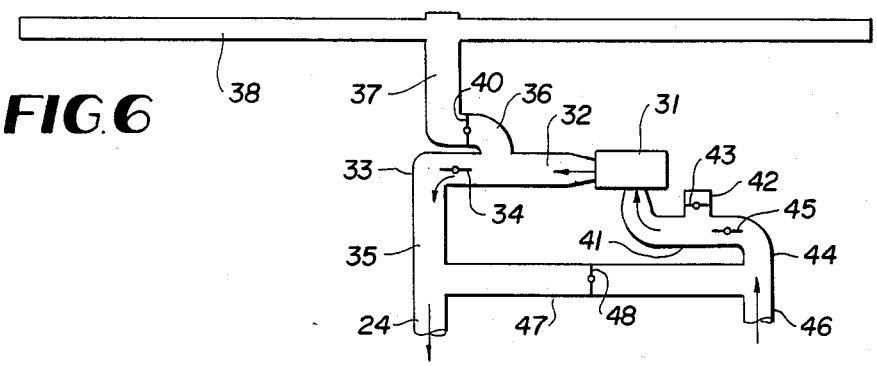
FIGS. 6 through 9 are partly schematic plan views depicting several operational modes of the aeration system according to the invention.

In FIG. 6, the fresh air inlet damper 43 and muffler control damper 40 are closed as is the damper 48 of transfer pipe 47. Dampers 45 and 34 are open. With the blower 31 operating in its single direction of operation, air within the system circulates continuously from the blower 31 through the main header pipe 24, through all of the apertured branch pipes 27 leading from the header pipe 24 and through the compost pile C, FIG. 2, in the direction of the arrows. After circulation through the pile C, the air enters the opposite side branch apertured pipes 27 connected with main header pipe 25 and back through this pipe to the blower 31 in a continuous circuit for aerating the compost pile.

Figure 7:
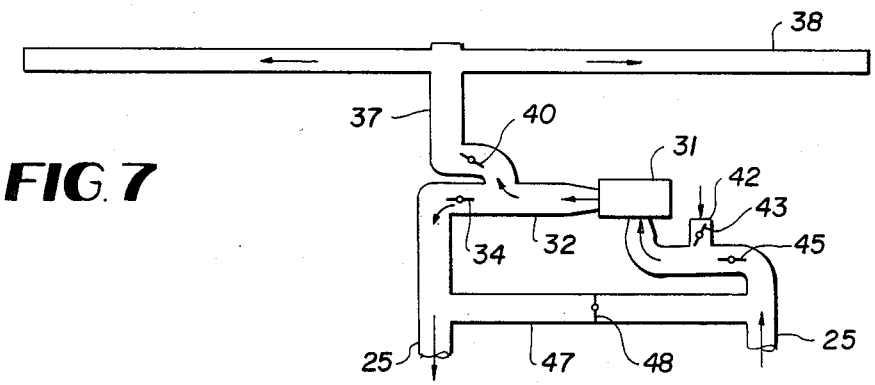

As shown in FIG. 7, the same aeration flow path continues to take place except that the fresh air control damper 43 and muffler control damper 44 are opened. The degree of opening of the damper 43 regulates the amount of fresh air drawn into the aeration system which can be varied from zero to one hundred per cent. Depending on ambient temperature and humidity conditions, this ability of the system to regulate the inlet of ambient air is very important and very necessary and forms a significant improvement over the prior art in finely controlling oxygenization, temperature and humidity throughout the compost pile.

Figure 8:
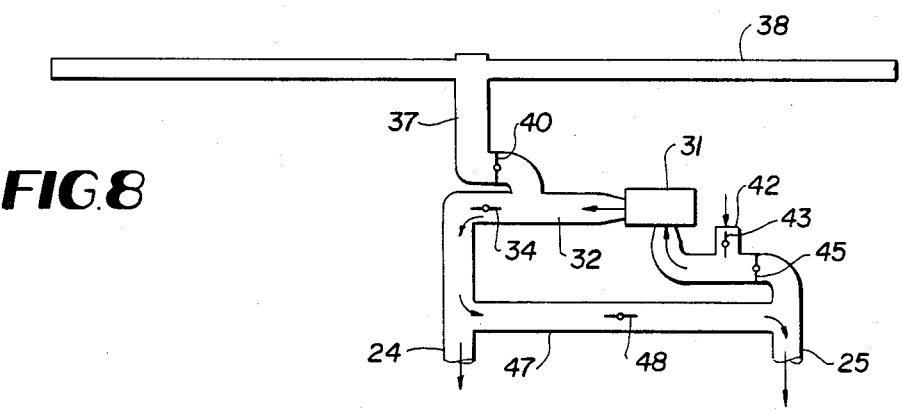

In another mode of operation, FIG. 8, the dampers 45 and 40 are closed while the other dampers 43, 34 and 48 are wide open. With the blower 31 running in the same direction, fresh ambient air is taken in by the blower 31 and is delivered simultaneously through both main header pipes 24 and 25 to the two groups of branch aeration pipes 27. In this manner, fresh ambient air is forced to flow outwardly through the compost pile C to the atmosphere in a continuous cycle while the blower 31 remains in operation.

Figure 9:
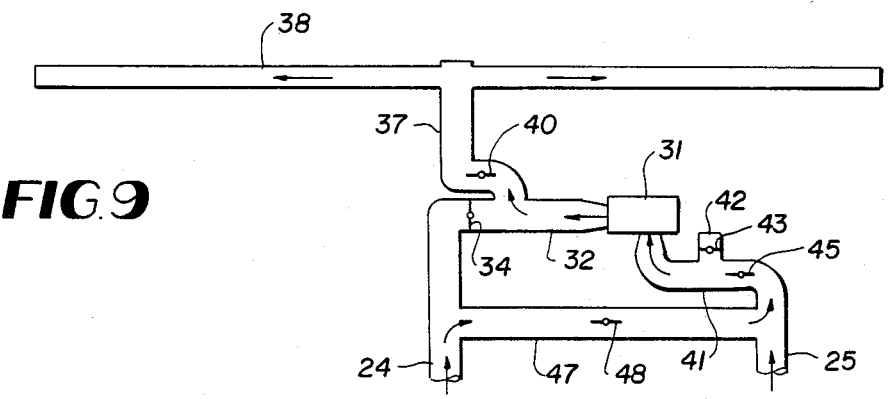

In another operation, which is the reverse of that shown in FIG. 8, the dampers 43 and 34 are closed while all of the other dampers of the system are open, FIG. 9. With the blower 31 running in the same direction, ambient air is sucked inwardly through the compost pile C and enters the apertures 28 of both groups of branch pipes 27 and from these branch pipes flows through both main header pipes 24 and 25 toward the blower 31. Air in the header pipe 24, FIG. 9, is diverted through the transfer pipe 47 to join the air flowing through main header pipe 25, whereby all of the air passes through the blower 31 and then exits to the atmosphere through the muffler 38.

It can be seen that the aeration system, while very simple, possesses a versatility of operation heretofore unknown in the art while allowing the use of a single non-reversible blower and a simple dampering arrangement. The many and diverse advantages of the aeration system should now be readily apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A compost aeration system comprising a pair of elongated parallel main header pipes having spaced bottom moisture drain openings along their lengths, a plurality of branch lateral aeration pipes connected with the outer side of each main header pipe in spaced relationship along the length of the main header pipe, each branch lateral aeration pipe having plural opposite side air distribution apertures spaced along the length of the branch lateral aeration pipe and also having bottom spaced moisture drain apertures along the length of the branch lateral aeration pipe, said air distribution apertures of each branch lateral aeration pipe being graduated in size along the length of each branch lateral aeration pipe with the smaller apertures toward the inner end of each branch lateral aeration pipe and the larger apertures toward its outer end, a one-way non-reversible air blower disposed near corresponding ends of main header pipes, an air delivery pipe for the blower connected between an inlet of the blower and one end of one main header pipe, an air discharge pipe for the blower connected between an outlet of the blower and one end of the other main header pipe, a transfer pipe connected between the main header pipes, an ambient air inlet connected in said air delivery pipe for the blower between the blower and said one main header pipe, an adjustable damper in said air delivery pipe between said ambient air inlet and one end of said transfer pipe, an adjustable damper in said ambient air inlet, an adjustable damper in said air discharge pipe, and another adjustable damper in said transfer pipe, whereby air from the blower containing varying amounts of ambient air can be circulated continuously in opposite directions through the main header pipes and through the compost pile or may be forced in the same direction through both main header pipes and blown outwardly through a compost pile to atmosphere or may be drawn by the blower in an opposite direction through both main header pipes and inwardly through a compost pile from the ambient atmosphere.

2. A compost aeration system as defined in claim 1, and an apertured muffler pipe disposed on one side of said air blower away from said branch lateral aeration pipes, a muffler supply pipe connected between said air discharge pipe for the blower and muffler pipe upstream of the adjustable damper in the air discharge pipe of the blower, and an adjustable damper within said muffler supply pipe.

* * * * *